United States Patent
Beri et al.

(10) Patent No.: US 9,961,931 B2
(45) Date of Patent: May 8, 2018

(54) SNACK FOOD SEASONING

(71) Applicant: Frito-Lay Trading Company GmbH, Berne (CH)

(72) Inventors: Akash Beri, Leicester (GB); Rachael Allen, Leicester (GB); Bruce Linter, Leicester (GB); Richard Watson, Edgbaston (GB); Fotis Spyropoulos, Edgbaston (GB); Ian Norton, Edgbaston (GB)

(73) Assignee: Frito-Lay Trading Company GmbH, Berne (CH)

( * ) Notice: Subject to any disclaimer, the term of this patent is extended or adjusted under 35 U.S.C. 154(b) by 0 days. days.

(21) Appl. No.: 15/308,193

(22) PCT Filed: Apr. 24, 2015

(86) PCT No.: PCT/EP2015/058988
§ 371 (c)(1),
(2) Date: Nov. 1, 2016

(87) PCT Pub. No.: WO2015/165830
PCT Pub. Date: Nov. 5, 2015

(65) Prior Publication Data
US 2017/0071243 A1    Mar. 16, 2017

(30) Foreign Application Priority Data

May 1, 2014  (GB) .................................. 1407709.3

(51) Int. Cl.
*A23L 1/00*        (2006.01)
*A23L 33/10*       (2016.01)
(Continued)

(52) U.S. Cl.
CPC ............ *A23L 33/10* (2016.08); *A23D 7/0053* (2013.01); *A23D 7/011* (2013.01); *A23L 27/72* (2016.08);
(Continued)

(58) Field of Classification Search
USPC ......................................................... 426/289
See application file for complete search history.

(56) References Cited

U.S. PATENT DOCUMENTS 3,949,094 A    4/1976  Johnson et al.
4,375,483 A    3/1983  Shuford et al.
(Continued)

FOREIGN PATENT DOCUMENTS

GB    1120447    7/1968
GB    1157363    7/1969
(Continued)

OTHER PUBLICATIONS

Frasch-Melnik et al., "Fat-crystal stabilised w/o emulsions for controlled salt release", Journal of Food Engineering, vol. 98, No. 4, Jun. 1, 2010, pp. 437-442.
(Continued)

*Primary Examiner* — Lien T Tran
(74) *Attorney, Agent, or Firm* — Colin P. Cahoon; Shaukat A. Karjeker; Carstens & Cahoon, LLP

(57) ABSTRACT

A topical seasoning for snack foods, the seasoning comprising a plurality of seasoning particles, the seasoning particles comprising a shell surrounding an encapsulated central core, the shell comprising a matrix including at least one solid lipid and the core comprising sodium chloride.

34 Claims, 1 Drawing Sheet

(51) Int. Cl.
- *A23D 7/005* (2006.01)
- *A23D 7/01* (2006.01)
- *A23P 20/10* (2016.01)
- *A23P 20/18* (2016.01)
- *A23L 29/10* (2016.01)
- *A23L 27/00* (2016.01)

(52) U.S. Cl.
CPC ............... *A23L 27/80* (2016.08); *A23L 29/10* (2016.08); *A23P 20/10* (2016.08); *A23P 20/11* (2016.08); *A23P 20/18* (2016.08); *A23V 2002/00* (2013.01)

(56) References Cited

U.S. PATENT DOCUMENTS

| | | |
|---|---|---|
| 5,891,494 A | 4/1999 | Badertscher |
| 9,775,367 B2 | 10/2017 | Norton et al. |
| 2004/0029750 A1 | 2/2004 | Schudel et al. |
| 2005/0238788 A1 | 10/2005 | Buononato et al. |
| 2007/0098875 A1 | 5/2007 | Howard et al. |
| 2008/0003339 A1 | 1/2008 | Johnson et al. |
| 2008/0003344 A1 | 1/2008 | Jensen et al. |
| 2008/0075813 A1 | 3/2008 | Smith et al. |
| 2009/0110781 A1 | 4/2009 | Baumgartner et al. |
| 2010/0146350 A1 | 6/2010 | Lin et al. |
| 2010/0297247 A1 | 11/2010 | Anton et al. |
| 2012/0100276 A1 | 4/2012 | Esteve et al. |
| 2013/0095210 A1 | 4/2013 | Zhang et al. |

FOREIGN PATENT DOCUMENTS

| | | |
|---|---|---|
| GB | 1163948 | 9/1969 |
| GB | 1163949 | 9/1969 |
| GB | 2388581 A | 11/2003 |
| GB | 2520371 | 9/2013 |
| WO | 9807324 | 2/1998 |
| WO | 2011126368 A1 | 10/2011 |

OTHER PUBLICATIONS

Nadin Maxime et al., "Fat crystal-stabilized water-in-oil emulsions as controlled release systems", Food Science and Technology, vol. 56, No. 2, Nov. 8, 2013, pp. 248-255.

PCT Search Report and Written Opinion for PCT/EP2015/058988 dated Jul. 31, 2015 (13 pages).

Search Report for Application GB1407709.3 dated Oct. 22, 2014 (7 pages).

SNACK FOOD SEASONING

CROSS REFERENCE TO RELATED APPLICATIONS

This application is a US 371 National Stage Application from PCT/EP2015/058988 filed Apr. 24, 2015, which claims priority to GB Application 1407709.3 filed May 1, 2014, the disclosures of which are incorporated herein by reference.

BACKGROUND

Field of the Invention

The present invention relates to a topical seasoning for a snack food, such as a starch-based snack food for example a potato chip or an expanded snack food produced from a starch-based snack food pellet. The present invention also relates to a snack food seasoned with a topical seasoning.

Description of the Related Art

It is well known to employ topical seasoning for flavouring snack foods, for example starch-based snack foods, typically in the form of snack chips, such as potato chips or expanded snack foods produced from a starch-based snack food pellet. On subsequent cooking, the pellet expands to produce an expanded low density porous snack food.

Known topical seasonings include sodium chloride, since many snack foods require a salty seasoning to meet the taste demands of the consumer. Such topical seasonings include sodium chloride crystals, in micronised or larger particle dimension, mixed with other seasoning ingredients.

There is a general desire to reduce the salt content of many foods, including processed foods such as snack foods. However, for snack foods, there is a problem of achieving a reduced sodium chloride content of the topical seasoning, and of the resultant snack food product, while also achieving the desired taste sensation required by consumers.

SUMMARY

The present invention aims to solve this problem of the production of known topical seasoning for snack foods.

Accordingly, the present invention provides a topical seasoning for snack foods, the seasoning comprising a plurality of seasoning particles and a continuous oil phase, wherein the topical seasoning is in the form of an emulsion, the plurality of seasoning particles comprising a particulate phase within the continuous oil phase, the seasoning particles comprising a shell surrounding an encapsulated central core, wherein the shell comprises a matrix including at least one solid lipid and the core comprises an aqueous solution of sodium chloride which has a sodium chloride concentration of from 0.1M to a saturated aqueous solution of sodium chloride.

The present invention further provides a snack food seasoned with the topical seasoning of the present invention. The application dosage of the topical seasoning may provide a sodium chloride concentration of from 0.05 to 0.15 wt % sodium chloride based on the weight of the unseasoned snack food. The core may comprise an aqueous solution of sodium chloride which has a sodium chloride concentration of from 1 to 6M.

The snack food may be composed of a cut vegetable piece, such as a slice, or may have been prepared from a dough which has been shaped into a desired shape. The snack food may be an expanded snack food prepared from a pellet. The snack food has been cooked, for example by fried, baked, microwaved, directly extruded or popped.

Preferred features of all of these aspects of the present invention are defined in the dependent claims.

BRIEF DESCRIPTION OF THE DRAWINGS

Embodiments of the present invention will now be described by way of example only, with reference to the accompanying drawings, in which.

DETAILED DESCRIPTION

The present invention is at least partly predicated on the finding by the present inventors that when sodium chloride is present in an encapsulated central core surrounded by a shell comprising a matrix including at least one solid lipid, this can form a seasoning particle which has particular application as a topical seasoning for snack foods.

Surprisingly it has been found that encapsulating the sodium chloride as an aqueous solution, typically having high molarity, within a lipid shell can provide a high salt taste in topical seasoning, thereby permitting lower salt content of snack food products to be achieved for an equivalent salty taste as compared to conventional crystalline salt seasonings.

The lipid shell can rapidly dissolve in the mouth, as a result of elevated temperature and the aqueous environment provided by saliva, and then the sodium chloride is released into the mouth to provide an instant salt flavour which is desired by consumers.

The seasoning particles are produced, and provided for the seasoning operation, in a liquid oil, for example sunflower oil, which acts as a sprayable liquid vehicle for controllably dispensing the seasoning particles onto the surface of the snack food. The use of a topical oil seasoning is well known in the snack food industry. The conventional spraying equipment can be sued to dispense, in a single operation, both topical oil and seasoning particles containing sodium chloride.

According to the present invention, there is provided a topical seasoning for snack foods. The seasoning comprises a plurality of seasoning particles.

Figure 1:
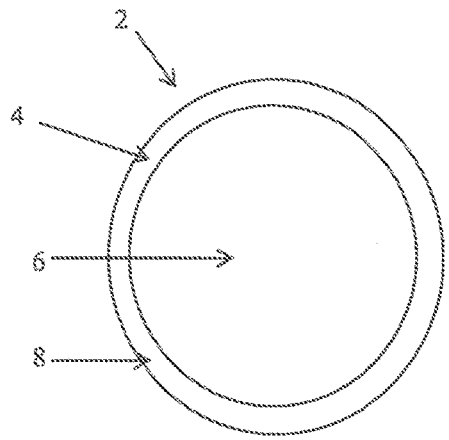
FIG. 1 is a schematic view of a seasoning particle in a topical seasoning for snack foods according to an embodiment of the present invention.

Referring to FIG. 1 which shows a schematic view of a seasoning particle in a topical seasoning for snack foods according to an embodiment of the present invention, the seasoning particles 2 comprise a shell 4 surrounding an encapsulated central core 6. The shell 4 comprises a matrix 8 including at least one solid lipid and the core 6 comprises sodium chloride.

The core 6 comprises an aqueous solution of sodium chloride. The aqueous solution of sodium chloride has a sodium chloride concentration of from 0.1M to a saturated aqueous solution of sodium chloride, optionally from 1 to 6M, further optionally from 3 to 5.5M.

Typically, the seasoning particle 2 comprises 3 to 30 wt % sodium chloride based on the weight of the seasoning particle 2.

The core 6 may comprise at least one other flavouring ingredient, which may optionally be in aqueous solution. The shell 4 may comprise at least one other flavouring ingredient, which may optionally be in a dispersion, suspension or solution in the matrix 8. Such additional ingredients are conventional in the snack food industry.

Typically, the core 7 is substantially spherical. The core 6 may have a maximum width dimension of from 2 to 100 μm. The core 6 may have diameter which is from 15 to 96% of a diameter of the particle 2. Typically, the shell 4 is substantially spherical. The shell 4 may have a maximum width dimension of from 10 to 150 μm and/or a wall thickness of from 1 to 75 μm. The shell 4 may have a wall thickness which is from 2 to 42.5% of a diameter of the particle 2.

Typically, the at least one solid lipid comprises at least one crystalline fat, for example the lipid comprises at least one triglyceride.

Most preferably, the at least one solid lipid comprises a mixture of at least one monoglyceride and at least one triglyceride. In such a mixture, the at least one solid lipid comprises from 0.25 to 5 wt %, optionally from 0.25 to 1 wt %, monoglyceride(s) and from 95 to 99.75 wt %, optionally from 99 to 99.75 wt %, triglyceride(s), each amount being based on the total weight of the mixture of monoglyceride(s) and triglyceride(s).

As described hereinbelow with respect to the manufacture of the particle, the shell is stabilised by a monoglyceride emulsifier to form a Pickering particle in an oil phase. The Pickering particle comprises the monoglyceride- and triglyceride-containing lipid shell surrounding the core which comprises a sodium chloride-containing aqueous phase, or solid sodium chloride if water have been permitted to evaporate or leach from the core, thereby forming a water-in-oil emulsion with the shell surrounding the aqueous phase.

The monoglyceride surfactant functions to form seed crystals during formation of the shell when the lipid mixture is cooled from the melt to below the melting temperature of the lipid components. These seed crystals are formed at, or migrate to, the interface of the aqueous phase and the oil phase in the water-in-oil emulsion. The seed crystals agglomerate together to form a shell surrounding an aqueous phase droplet. After the monoglyceride seed crystals have been formed, the triglyceride crystallises onto the seed crystals, thereby forming a coherent shell surrounding the aqueous phase core.

Although the presence of the monoglyceride surfactant, which acts as an emulsifier, causes fat crystals preferentially to agglomerate at the oil phase/aqueous phase interface and thereby form a shell, some solid fat crystals may remain within the continuous oil phase of the emulsion and are not incorporated into a shell.

Preferably, the at least one solid lipid comprises a vegetable-based triglyceride, for example an unsaturated triglyceride derived from at least one of sunflower oil and cottonseed oil. Preferably, a high oleic acid sunflower oil is employed. Typically, the sunflower oil comprises at least 80 wt % oleic acid based on the total weight of fatty acids in the sunflower oil. In preferred embodiments, the at least one solid lipid has a melting point of from 30 to 95° C.

Preferably, the at least one solid lipid also comprises a saturated monoglyceride, which is a fatty acid glyceryl monoester, with the fatty acid chain having an average of from 10 to 20 carbon atoms, typically an average of from 12 to 18 carbon atoms. Typically the monoglyceride has been distilled to provide the desired purity of the selected carbon chain length monoglyceride. The monoglyceride is typically derived from sunflower, rapeseed, palm and/or soya bean oil. Alternatively a synthetic monoglyceride is employed. A typical monoglyceride is an emulsifier comprising glycerol monolaurate, glycerol monostearate or an emulsifier available in commerce from Danisco, UK, under the trade name Dimodan HP or Dimodan P, or any mixture thereof.

In some preferred embodiments, the at least one solid lipid comprises from 3 to 15 wt % of the total weight of the seasoning particle. In some preferred embodiments, the core comprises from 15 to 96 wt % of the total weight of the seasoning particle.

The topical seasoning is in the form of an emulsion, with the plurality of seasoning particles comprising a particulate phase within a continuous oil phase. The oil phase may comprise at least one of a monoglyceride, a triglyceride or a mixture thereof, for example a vegetable-based oil, typically an unsaturated oil derived from at least one of sunflower oil and cottonseed oil. Preferably, a high oleic acid sunflower oil is employed. Preferably, the sunflower oil comprises at least 80 wt % oleic acid based on the total weight of fatty acids in the sunflower oil.

The at least one solid lipid may comprise from 1 to 30 wt % of the total oil and fat content of the topical seasoning and the continuous oil phase comprises from 70 to 99 wt % of the total oil and fat content of the topical seasoning. Typically, the total oil and fat content of the topical seasoning is from 40 to 80 wt % of the total weight of the topical seasoning. Typically, sodium chloride comprises from 1 to 12 wt % of the total weight of the topical seasoning.

A snack food may be seasoned with the topical seasoning of the present invention using any known seasoning technique or apparatus. For example, since the topical seasoning is in the form of an emulsion, the emulsion may be sprayed from a spray head onto the cooked snack food prior to packaging.

Figure 2:
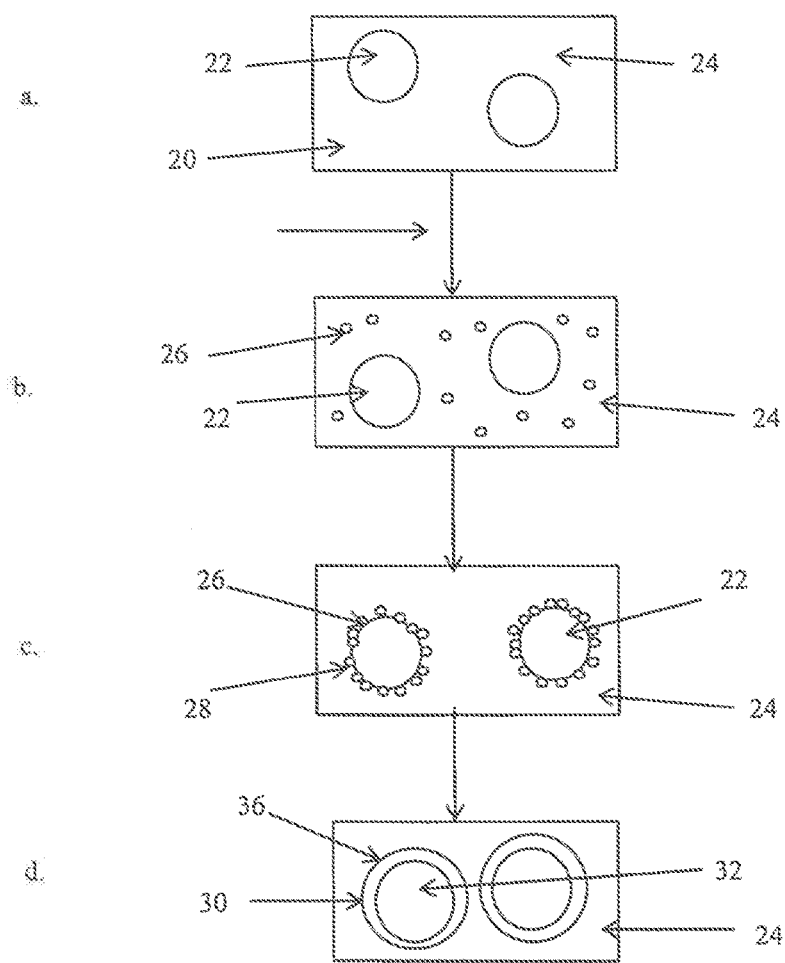
FIG. 2 is a flow chart showing steps in the production of the seasoning particle of FIG. 1.

The topical seasoning of the present invention, as described above, may be made according to the following method, with reference to FIG. 2.

Aspects of this method for forming fat-crystal stabilised water-in-oil emulsions are disclosed in "Fat-crystal stabilised w/o emulsions for controlled salt release", Sarah Frasch-Melnik et al, Journal of Food Engineering 98 (2010) 437-442, "$W_1/O/W_2$ double emulsions stabilised by fat crystals—Formulation, stability and salt release", Sarah Frasch-Melnik et al, Journal of Colloid and Interface Science 350 (2010) 178-185 and "Fat-crystal stabilised water-in-oil emulsions as controlled release systems", Maxime Nadin et al, LWT-Food Science and Technology 56 (2014) 248-255. Although these publications disclose the production of stabilised water-in-oil emulsions for releasing salt, there is no disclosure or hint of the use of such emulsions as topical seasoning for snack food, or the unexpected effect of the enhanced salt delivery of such topical seasonings.

In a first step, at least one lipid, to form the shell, is heated so as to be liquefied. The at least one lipid comprises the composition described above with respect to FIG. 1. Typically, the at least one lipid is heated to a temperature of at least 10° C. above the melting point of the lipid mixture, ideally at least 80° C.

Then, as illustrated in FIG. 2a, an aqueous solution of sodium chloride, preferably pre-heated to the same temperature as that of the at least one lipid, is mixed with the liquefied at least one lipid to form a water-in-oil pre-emulsion 20 comprising aqueous phase particles or droplets 22, containing sodium chloride, in a continuous oil phase 24. The aqueous solution of sodium chloride has the concentration as described above with respect to FIG. 1.

Typically the weight ratio of the aqueous solution to the at least one lipid is from 30:70 to 70:30, typically about 60:40.

The pre-emulsion 20 is subjected to additional emulsification of the initial mixture to form a more well dispersed water in oil emulsion comprising aqueous phase particles or droplets in a continuous oil phase, whilst simultaneously cooling the emulsion to form a plurality of seasoning particles in the oil phase.

As illustrated in FIG. 2b, the emulsification and cooling forms solid crystalline glyceride particles 26 in the oil phase. These constitute seed crystals 26. When the oil phase includes a mixture of a saturated monoglyceride and a triglyceride, as discussed above with respect to FIG. 1, the monoglyceride forms the seed crystals 26. These seed crystals 26 are formed at, or migrate to, the interface of the aqueous phase and the oil phase in the water-in-oil emulsion.

As illustrated in FIG. 2c, the seed crystals 26 agglomerate together at the interface to form a shell 28 surrounding aqueous phase droplets 22.

As illustrated in FIG. 2d, after the monoglyceride seed crystals 26 have agglomerated at the interface, the triglyceride crystallises onto the seed crystals 26, thereby forming a coherent shell 30 surrounding the aqueous phase core 32.

The resultant seasoning particles 34 comprise a shell 30 surrounding an encapsulated central core 32. The shell 30 comprises a matrix 36 including the at least one solid lipid and the core 32 comprises the aqueous solution of sodium chloride.

As described above, during the additional emulsification the cooling forms solid lipid crystals in the oil phase which migrate to an interface between the aqueous phase particles and the continuous oil phase, and the crystals agglomerate to form the shell.

During the additional emulsification step, the emulsion is cooled to a temperature below 30° C., for example below 25° C. Typically, the additional emulsification is at least partially carried out in a cooling unit which is a scrape-surface heat exchanger having at least one surface cooled to a temperature of from 5 to 30° C., optionally from 5 to 25° C. The cooling unit may comprise an outer housing defining a cooling chamber and a rotating scraper mechanism within the chamber which scrapes solid lipid material off an inner surface of the outer housing. Typically, the rotating scraper mechanism has a rotational speed of from 500 to 2000 rpm.

After the additional emulsification, the plurality of seasoning particles in the oil phase may be passed, in a second mixing step, through a mixer to cause breakage of solid lipid linkages between seasoning particles. This may also reduce the particle size. The mixer may comprise a rotating pin stirrer.

After the second mixing step, the resultant mixture is typically recycled through the additional emulsification which again simultaneously cools the emulsion. After the additional emulsification, the resultant mixture is recycled through the second mixing step. Such recycling steps may cause further breakage of any solid lipid linkages between seasoning particles and may also further reduce the particle size.

The product of the final mixing step may be an emulsion ready to use as a topical seasoning according to the present invention.

EXAMPLES

The present invention is further illustrated with reference to the following non-limiting Examples.

Comparative Example 1

Potato chips were coated in crystalline salt particles having a particle dimension representative of sea salt crystals typically used to season potato chips. The particles were dispensed onto the potato chips to provide a topical seasoning. The application dosage was selected to provide 0.3 wt % sodium chloride based on the weight of the unseasoned potato chips.

The seasoned potato chips were subjected to a taste test. The texture of the seasoned potato chips was determined on a scale of from 0 to 10, a score of 0 representing poor texture (for example softness, excessive oiliness, staleness, variable texture) and a score of 10 representing good texture (for example crispiness, low oiliness, freshness, consistent texture). The saltiness of the seasoned potato chips was also determined on a scale of from 0 to 10, a score of 0 representing an absence of a salty flavour and a score of 10 representing a highly salty flavour.

The seasoned potato chips of Comparative Example 1 exhibited a texture score of 9 and a saltiness score of 7. There was a crunchy texture with an instant salt flavour sensation (i.e. a flavour "hit").

Comparative Example 2

Potato chips were coated in crystalline salt particles having a particle dimension representative of micronised salt crystals typically used to season potato chips. The particles were dispensed onto the potato chips to provide a topical seasoning. The application dosage was selected to provide 0.3 wt % sodium chloride based on the weight of the unseasoned potato chips.

The seasoned potato chips were subjected to the same taste test as for Comparative Example 1.

The seasoned potato chips of Comparative Example 2 exhibited a texture score of 7 and a saltiness score of 2. There was good texture with a low salt flavour.

Example 1

A water-in-oil emulsion was formed comprising 60 wt % aqueous phase and 40 wt % oil phase. The aqueous phase comprised sodium chloride having a concentration of 5M. The oil phase comprised 99.5 wt % high oleic acid sunflower oil and 0.5 wt % Dimodan HP, an emulsifier comprising a distilled saturated monoglyceride. The water-in-oil emulsion was heated to a temperature of 80° C. and mixed in a high shear mixer to form a pre-emulsion. The pre-emulsion was then passed through a scraped-surface heat exchanger (called an "A unit"), and subsequently through a pin stirrer (called a "C unit"), both apparatus being known in the art for making fat-containing emulsions in the food industry. The scraped-surface heat exchanger and the pin stirrer were both cooled by water at a temperature of 5° C. The oil phase in the water-in-oil emulsion rapidly crystallised in the scraped-surface heat exchanger to form fat crystals, as discussed above, and the pin stirrer applied shear to cause phase inversion under cooling to prevent the fat crystals from melting.

After exiting the pin stirrer, the water-in-oil emulsion was recycled back, in a second pass, through the scraped-surface heat exchanger and the pin stirrer to reduce droplet size and remove fat linkages between the droplets.

The resulting product comprised a water-in-oil emulsion seasoning particles in a continuous oil phase, the particles comprising a lipid shell surrounding an encapsulated central core comprising an aqueous solution of sodium chloride.

The emulsion was sprayed onto potato chips to provide a topical seasoning. The application dosage was selected to provide 0.15 wt % sodium chloride based on the weight of the unseasoned potato chips.

The seasoned potato chips were subjected to the same taste test.

The seasoned potato chips of Example 1 exhibited a texture score of 9 and a saltiness score of 7. There was good texture, and an instant salt flavour hit which faded.

Example 2

Example 1 was repeated, but modified so as to use 0.5 wt % glycerol monolaurate as the saturated monoglyceride emulsifier.

The emulsion was sprayed onto potato chips to provide a topical seasoning, and the application dosage was also modified to provide 0.06 wt % sodium chloride based on the weight of the unseasoned potato chips.

The seasoned potato chips were subjected to the same taste test. The seasoned potato chips exhibited a texture score of 6 and a saltiness score of 6. There was good texture and a good salt flavour.

A comparison of Examples 1 and 2 with Comparative Examples 1 and 2 shows that the topical seasoning of the present invention can readily be used control the salty taste and texture of snack foods. Moreover, the topical seasoning of the present invention can also achieve a similar salty taste as conventional crystalline salt, yet at significantly lower salt content. Example 1 achieved an instant salt flavour hit, providing a higher salt flavour than the standard crystal salt used in Comparative Example 1, yet requiring only 50% of the salt content of the resultant seasoned snack food which was used in Comparative Example 1. Example 2 achieved a good salt flavour, providing a higher salt flavour than the standard micronized salt used in Comparative Example 2, yet requiring only 20% of the salt content of the resultant seasoned snack food which was used in Comparative Example 2.

Surprisingly it has been found therefore that encapsulating the sodium chloride as an aqueous solution, typically having high molarity, within a lipid shell can provide a high salt taste in topical seasoning, thereby permitting lower salt content of snack food products to be achieved. The lipid shell can rapidly dissolve in the mouth, as a result of elevated temperature and the aqueous environment provided by saliva, and then the sodium chloride is released into the mouth to provide an instant salt flavour which is desired by consumers.

Various modifications to the present invention will be readily apparent to those skilled in the art.

The invention claimed is:

1. A method of topically seasoning a snack food, the method comprising topically applying a topical seasoning to the snack food, the topical seasoning comprising a plurality of seasoning particles and a continuous oil phase, wherein the topical seasoning is in the form of an emulsion, the plurality of seasoning particles comprising a particulate phase within the continuous oil phase, the seasoning particles comprising a shell surrounding and encapsulating a central core, wherein the shell comprises a matrix including at least one solid lipid and the core comprises an aqueous solution of sodium chloride which has a sodium chloride concentration of from 0.1M to a saturated aqueous solution of sodium chloride, wherein the at least one solid lipid comprises a mixture of at least one monoglyceride and at least one triglyceride, the mixture comprising from 0.25 to 5 wt % monoglyceride and from 95 to 99.75 wt % triglyceride, each amount being based on total weight of the mixture of monoglyceride and triglyceride.

2. The method according to claim 1 wherein the aqueous solution of sodium chloride has a sodium chloride concentration of from 1 to 6M.

3. The method according to claim 2 wherein the aqueous solution of sodium chloride has a sodium chloride concentration of from 3 to 5.5M.

4. The method according to claim 1 wherein the seasoning particle comprises 3 to 30 wt % sodium chloride based on the weight of the seasoning particle.

5. The method according to claim 1 wherein the core comprises at least one other flavouring component.

6. The method according to claim 4 wherein the at least one other flavouring component is in aqueous solution.

7. The method according to claim 1 wherein the core is substantially spherical.

8. The method according to claim 1 wherein the core has a maximum width dimension of from 2 to 100 μm.

9. The method according to claim 1 wherein the core has diameter which is from 15 to 96% of a diameter of the particle.

10. The method according to claim 1 wherein the at least one solid lipid comprises at least one crystalline fat.

11. The method according to claim 1 wherein the at least one solid lipid comprises at least one a triglyceride.

12. The method according to claim 1 wherein the mixture of at least one monoglyceride and at least one triglyceride comprises from 0.25 to 1 wt %, monoglyceride and from 99 to 99.75 wt %, triglyceride, each amount being based on total weight of the mixture of monoglyceride and triglyceride.

13. The method according to claim 1 wherein the monoglyceride comprises a saturated monoglyceride, which is a fatty acid glyceryl monoester, with the fatty acid chain having an average of from 10 to 20 carbon atoms.

14. The method according to claim 13 wherein the monoglyceride comprises at least one of glycerol monolaurate, glycerol monostearate or a mixture thereof.

15. The method according to claim 1 wherein the at least one solid lipid comprises a vegetable-based triglyceride.

16. The method according to claim 15 wherein the vegetable-based triglyceride is an unsaturated fat derived from at least one of sunflower oil and cottonseed oil.

17. The method according to claim 16 wherein the sunflower oil comprises at least 80 wt % oleic acid based on the total weight of fatty acids in the sunflower oil.

18. The method according to claim 1 wherein the at least one solid lipid has a melting point of from 30 to 95° C.

19. The method according to claim 1 wherein the shell comprises at least one other flavouring component.

20. The method according to claim 19 wherein the at least one other flavouring component is in a dispersion, suspension or solution in the matrix.

21. The method according to claim 1 wherein the shell is substantially spherical.

22. The method according to claim 1 wherein the shell has a maximum width dimension of from 10 to 150 μm and a wall thickness of from 1 to 75 μm.

23. The method according to claim 1 wherein the shell has a wall thickness which is from 2 to 42.5% of a diameter of the particle.

24. The method according to claim 1 wherein the at least one solid lipid comprises from 3 to 15 wt % of the total weight of the seasoning particle.

25. The method according to claim 1 wherein the core comprises from 15 to 96 wt % of the total weight of the seasoning particle.

26. The method according to claim 1 wherein the oil phase comprises at least one of a monoglyceride, a triglyceride or a mixture thereof.

27. The method according to claim 1 wherein the oil phase comprises a vegetable-based oil.

28. The method according to claim 27 wherein the vegetable-based oil is an unsaturated oil derived from at least one of sunflower oil and cottonseed oil.

29. The method according to claim 28 wherein the sunflower oil comprises at least 80 wt % oleic acid based on the total weight of fatty acids in the sunflower oil.

30. The method according to claim 1 wherein the at least one solid lipid comprises from 1 to 30 wt % of total oil and fat content of the topical seasoning and the continuous oil phase comprises from 70 to 99 wt % of total oil and fat content of the topical seasoning.

31. The method according to claim 1 wherein total oil and fat content of the topical seasoning is from 40 to 80 wt % of total weight of the topical seasoning.

32. The method according to claim 1 wherein sodium chloride comprises from 1 to 12 wt % of total weight of the topical seasoning.

33. The method of claim 1 wherein the topical application is by spraying.

34. The method according to claim 1 wherein the snack food comprises potato chips.

* * * * *